United States Patent [19]

Nakatani et al.

[11] Patent Number: 5,055,280

[45] Date of Patent: Oct. 8, 1991

[54] PROCESS FOR PRODUCING TRANSITION METAL BORIDE FIBERS

[75] Inventors: Isao Nakatani, Funabashi; Kiyoshi Ozawa, Tokyo, both of Japan

[73] Assignee: National Research Institute For Metals, Tokyo, Japan

[21] Appl. No.: 245,298

[22] Filed: Sep. 16, 1988

[30] Foreign Application Priority Data

Sep. 18, 1987 [JP] Japan ................................ 62-232368

[51] Int. Cl.$^5$ .............................................. C01B 35/00
[52] U.S. Cl. ................................... 423/276; 423/278; 423/285
[58] Field of Search ............... 423/276, 278, 286, 287, 423/297

[56] References Cited

U.S. PATENT DOCUMENTS

| | | | |
|---|---|---|---|
| 3,657,089 | 4/1972 | Takahashi et al. | 423/297 |
| 3,979,500 | 9/1976 | Sheppard et al. | 423/297 |
| 4,022,872 | 5/1977 | Carson et al. | 423/297 |
| 4,080,431 | 3/1978 | Moss | 423/297 |
| 4,282,195 | 8/1981 | Hoekje | 423/289 |
| 4,353,885 | 10/1982 | Hoekje | 423/297 |
| 4,452,767 | 6/1984 | Brynestad et al. | 423/277 |
| 4,503,021 | 3/1985 | Brynestad et al. | 423/297 |
| 4,606,902 | 8/1986 | Ritter | 423/297 |

FOREIGN PATENT DOCUMENTS

| | | |
|---|---|---|
| 55-145145 | 11/1980 | Japan . |
| 56-23246 | 3/1981 | Japan . |
| 60-234937 | 11/1985 | Japan . |
| 61-12848 | 1/1986 | Japan . |
| 63-17148 | 1/1987 | Japan . |
| 63-170212 | 7/1988 | Japan ................................ 423/297 |

OTHER PUBLICATIONS

Grant & Hackh's Chemical Dictionary 5th Ed.; McGraw Hill Book Company; N.Y. 1987 p. 118.

*Primary Examiner*—Theodore Morris
*Assistant Examiner*—Edward Squillante
*Attorney, Agent, or Firm*—Wenderoth, Lind & Ponack

[57] ABSTRACT

A process for producing fibers of a transition metal boride, which comprises reacting a mixture of a vapor of an evaporable boron compound an a vapor of an evaporable transition metal compound in the presence of a catalyst composed of at least one metal selected from the group consisting of Pt, Pd, Cu, Au and Ni.

8 Claims, 2 Drawing Sheets

PROCESS FOR PRODUCING TRANSITION METAL BORIDE FIBERS

This invention relates to a process for producing transition metal boride fibers.

Fibrous transition metal borides are useful as a heat-resistant high-tenacity fibrous material and fibers for reinforcing heat-resistant alloys. They can also be used as an anticorrosive material because of their chemical stability and as an electrically conductive material because of their high electrical conductivity.

Processes have previously been known for producing thin films, bulk crystals and powders of transition metal borides.

The transition metal boride films are produced by a vapor-phase reaction method, which, for example, comprises introducing a vapor of a transition metal halide, a vapor of a boron halide, and hydrogen gas into an open tube provided with an alumina or graphite plate as a substrate, and simultaneously heating the substrate to reduce the transition metal halide vapor and the boron halide vapor with hydrogen gas to deposit a thin film of the transition metal boride on the substrate [see, for example, H. O. Pierson, E. Randrich and D. M. Mattox: J. Less-Common Met., 67 (1979) 381; and J. Bouix, H. Vincent, M. Boubehira and J. C. Viala: J. Less-Common Met., 117 (1986) 83].

The transition metal boride bulk crystals are produced by the reaction of a transition metal with boron in a molten Fe, Co, Ni or Al flux containing the transition metal and boron with a stoichiometric composition [see, for example, A. A. Abdel-Hamid: J. Cryst. Growth, 71 (1985) 744; and K. Nakano and H. Hayashi: J. Cryst. Growth, 24/25 (1974) 679]. This method gives single crystals or polycrystals having a size of several mm at a maximum.

The transition metal boride powders are produced by the direct reaction method which comprises heating a transition metal and boron mixed in a stoichiometric proportion to at least 1000° C. in vacuum to react them directly [see, for example, K. Miyata and A. Sawaoka: Journal of the Ceramic Industry Association, 90 (1982) 610; and Japanese Laid-Open Patent Publication No. 270348/1986].

The above methods cannot produce transition metal boride fibers.

It is an object of this invention to provide a process for producing fibers of a transition metal boride which have not been obtained heretofore.

The present inventors made extensive investigations in order to achieve the above object, and found that when in the production of a transition metal boride by vapor-phase reaction of an evaporable boron compound and an evaporable transition metal compound, at least one metal selected from the group consisting of Pt, Pd, Cu, Au and Ni is used as a catalyst, the transition metal boride can be grown into a fibrous form.

The present invention thus provides a process for producing fibers of a transition metal boride, which comprises reacting a mixture of a vapor of an evaporable boron compound and a vapor of an evaporable transition metal compound in the presence of a catalyst composed of at least one metal selected from the group consisting of Pt, Pd, Cu, Au and Ni.

Examples of the evaporable boron compound are boron halides, diborane and trialkylboranes.

Examples of the evaporable transition metal compound are halogen compounds of transition metals such as Ti, Zr, Hf, V, Cr, Nb, Mo, W, Sc, and Ta. Halogen compounds of Ti, Zr and Hf are preferred. Other transition metal compounds may be used so long as they can be evaporated.

Preferably, the metal catalyst is in the form of fine particles with a diameter of 10 Å to 100 μm. The diameter of the resulting metal boride fibers depends upon the diameter of the fine particles of the metal catalyst. Thus, when it is desired to obtain fibers with a diameter of several hundred Å, it is preferred to use fine particles having a particle diameter of several tens of Å as the catalyst. The metal catalyst may be in the form of a thin film if it has such a thickness that at the temperature of the vapor phase reaction, fine molten metal droplets can be formed. Preferably, the metal catalyst is supported on a substrate such as graphite or alumina, and provided in a reaction chamber. The supporting may be effected by simply placing the fine particulate metal catalyst on the substrate, or depositing it in fine particles or a thin film on the substrate by vacuum evaporation, sputtering, plasma CVD, etc. Alternatively, it is possible to introduce a decomposable metal compound containing the element of the catalyst together with a carrier gas into a reaction tube and form a fine particulate metal catalyst concurrently with the vapor-phase reaction.

In the present invention, a binary or ternary alloy composed of one metal selected from Ni, Pd and Pt and one or more constituent elements of the metal boride to be produced may be used as catalyst. Examples of the binary or ternary alloys include Ni-B, Pd-B, Pt-B, Ni-Ti, Pd-Ti, Ni-Ti-B, Pd-Ti-B and Pt-Ti-B.

Preferably, these alloys have such a composition that the alloy lump is mechanically brittle and easily crushable and can be easily converted to a fine powder by a crushing method or a grinding method. The Ni-B alloy is 30–90 atomic % Ni-B, preferably 50 atomic % Ni-B. The Pd-B alloy is 3–90 atomic % Pb-B, preferably 70 atomic % Pd-B. The Pt-B alloy is 20–80 atomic % Pt-B, preferably 60 atomic % Pt-B. The Ni-Ti alloy is 13–92 atomic % Ni-Ti, preferably 25 atomic % Ni-Ti. The Pd-Ti alloy is 10–70 atomic % Pd-Ti, preferably 33 atomic % Pd-Ti. The Pt-Ti alloy is 10–40 atomic % Pt-Ti, preferably 16 atomic % Pt-Ti.

Preferably, ternary alloys such as Ni-Ti-B, Pd-Ti-B and Pt-Ti-B have a composition obtained by mixing the above binary alloys.

These alloys are mechanically brittle and easily crushable. Hence, the alloys are converted into fine or ultrafine particles, and placed on a substrate which is placed in a reaction tube or in a vessel. They may alternatively be fed into a reaction tube as an aerosol together with the reaction gas or a carrier gas.

A few specific embodiments of the process of this invention for producing transition metal boride fibers will be described with reference to the accompanying drawings in which.

Figure 1:
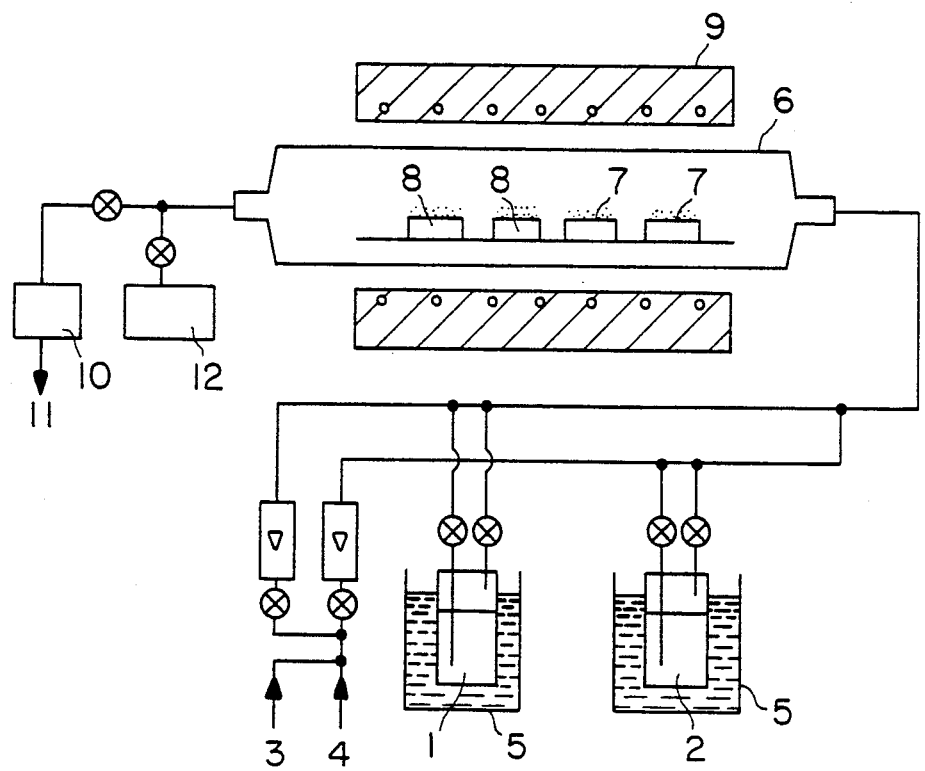
FIG. 1 is a rough view showing one embodiment of the process of this invention.

In FIG. 1, the reference numeral 1 represents an evaporator for evaporating the transition metal compound; 2, an evaporator for evaporating the boron compound; and 3 and 4, carrier gas introducing openings. $H_2$, Ar, $N_2$ or He may, for example, be used as the carrier gas. The reference numeral 5 represents a constant-temperature vessel for controlling the vapor pressure of the starting gas.

Vapors of the transition metal compound and the boron compound obtained at the evaporators 1 and 2 are mixed, and the gaseous mixture is introduced into a reaction tube 6. The reference numeral 7 represents a metal catalyst.

A substrate 8 for supporting the metal catalyst, such as graphite or alumina, is provided in the reaction tube 6. A heating device 9 is provided for heating the reaction tube 6. The heating is carried out by an electrical resistance heating method, an infrared heating method or an electromagnetic induction heating method, for example. The heating temperature is about 800° to 1,500° C.

The exhaust gas from the vapor-pase reaction is discharged from a discharge port 11 through a trap 10. A gas discharge device 12 is provided for purging of the reaction tube 6. It is used to replace the inside atmosphere of the reaction tube 6 by the reaction gas at the start of the vapor-phase reaction and replace the residual exhaust gas in the reaction system by Ar, $N_2$ or He gas at the end of the reaction.

Figures 2A, 2B:
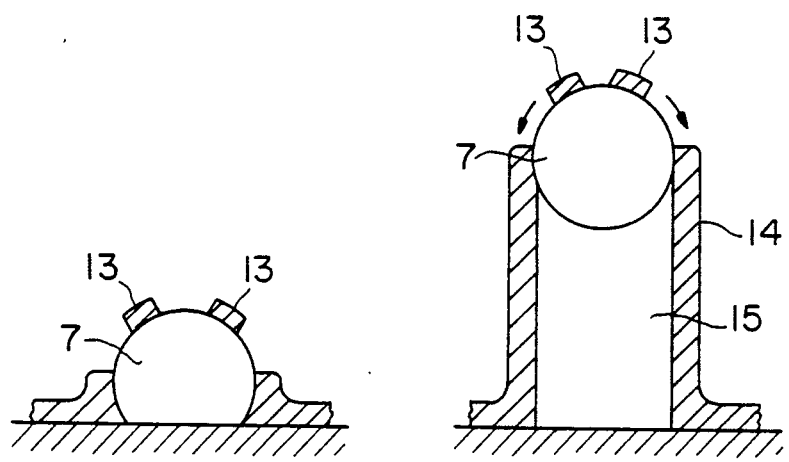
FIG. 2 is a rough view for illustrating the mechanism of growing the transition metal boride fibers.

The mechanism by which the transition metal boride fibers grow by the process of this invention is presumed to be as follows. As shown in FIG. 2-a, the transition metal boride 13 predominantly deposits on the fine particulate metal catalyst 7, and diffuses on the surface or interior of the fine particulate metal catalyst. It is accumulated between the fine particles and the substrate to form a layer of single crystals. Repetition of this process pushes the fine metal particles upwards, and transition metal boride fibers 14 are formed beneath them (FIG. 2-b). The reference numeral 15 represents a hollow area. It will thus be understood that the diameter of the fibers corresponds to the diameter of the catalyst particles.

Figure 3:
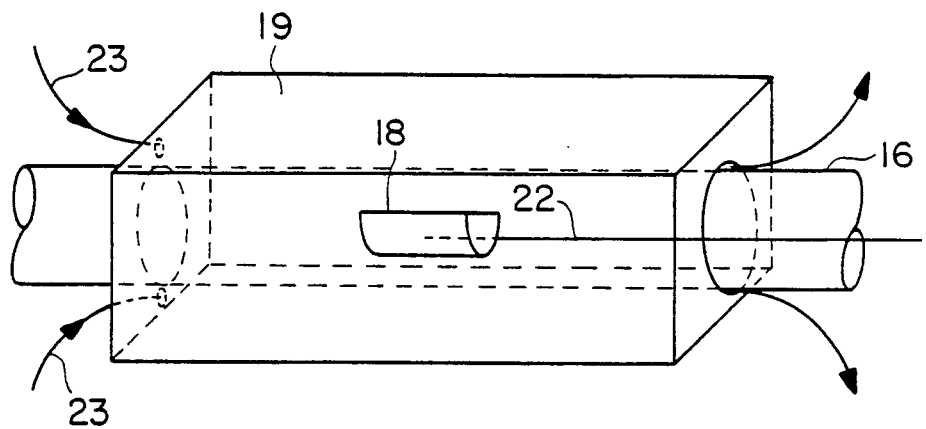
FIG. 3 is a rough view showing another specific embodiment of the process of this invention.
Figure 4:
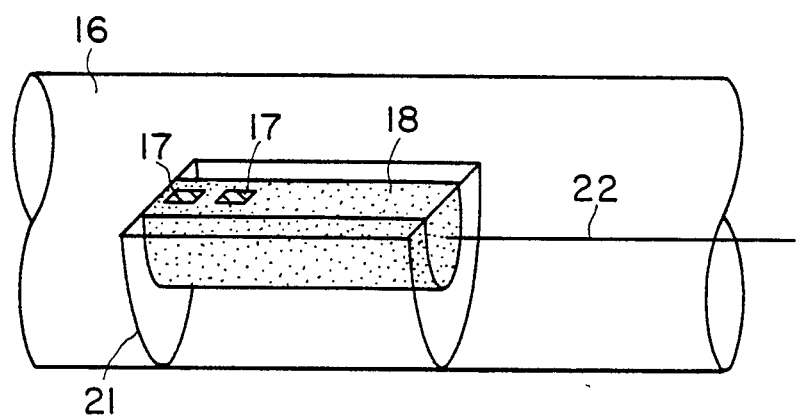
FIG. 4 is an enlarged view of the central part of the reaction tube shown in FIG. 3.

FIGS. 3 and 4 show another embodiment of the process of this invention. In these figures, the reference numeral 19 represents a heating device for heating a substrate 18 for supporting a metal catalyst 17. The heating device may be, for example, an infrared heating furnace or an electromagnetic induction heating furnace, or the heating may be carried out by directly passing an electric current through the substrate. A reaction tube 16 may be made of a suitable material selected depending upon the method of heating. Specifically, when the infrared heating method is used, it is made of a material easily permitting transmission of infrared rays, such as transparent quartz. For the electromagnetic induction heating method, a material which easily permits transmission of electromagnetic waves, such as transparent quartz and alumina may be used. The reaction tube 16 is preferably a cylindrical hollow tube, but may be of the bell-jar type. Its shape is not limited. The substrate 18 supporting the metal catalyst is set up so as to be thermally insulated from the reaction tube 16. The insulating method is to place the substrate 18 on a supporting stand 21 of a material having a low thermal conductivity, such as quartz or alumina, or to thrust a rod made of a material having a low thermal conductivity from the reaction tube 16 and causing it to support the substrate 18, or to use a thermocouple 22 as the supporting rod. These are only illustrative, and any method which effects thermal insulation may be used. The reaction tube 16 is cooled from outside by a cooling device 23. The method of cooling may be, for example, water cooling or gas jet cooling. When the infrared heating method or the electromagnetic induction heating method is used, it is necessary not to obstruct the incidence of the energy of infrared rays or electromagnetic waves.

The reaction product is thus prevented from adhering to and building up on the inside wall of the reaction tube by thermally insulating the substrate supporting the metal catalyst in the inside of the reaction tube from the reaction tube, providing a heating source for heating only the substrate selectively, and providing a cooling device for forcibly cooling the reaction tube. Consequently, the proportion of the starting material utilized increases, and the reaction tube can be operated for a long period of time without the need to clean it. As a result, the efficiency of producing the metal boride fibers increases.

The process of this invention yields the transition metal boride fibers, which have not heretofore been produced, with good efficiency. Transition metal boride fibers having a diameter of several tens of Å to several microns, and a length of several microns to several millimeters, can be obtained by the process of this invention. The resulting fibers are useful as a heat-resistant high-tenacity fibrous material and fibers for reinforcing heat-resistant alloys. They can also be used as an anticorrosive material because of their chemical stability and as an electrically conductive material because of their high electrical conductivity.

The binary or ternary alloy composed of the catalytically active metal and the constituent elements of the metal boride to be used as the catalyst in the process of this invention can be easily converted into fine particles by pulverization. The fine particulate catalyst can be used by placing it on a catalyst supporting substrate or in a vessel, or by feeding it into the reaction tube as an aerosol together with the reaction gas or a carrier gas. Accordingly, it is not necessary to deposit the catalyst on the substrate by vapor deposition, sputtering or plasma CVD. Accordingly, no expensive depositing device nor complex operation is required, and the cost of production can be curtailed.

The following examples illustrate the present invention in greater detail.

EXAMPLE 1

The apparatus shown in FIG. 1 was used. $TiCl_4$ was fed into evaporator 1, and $BBr_3$ was fed into evaporator 2. Constant temperature vessel 5 was maintained at 30° C. The resulting starting gases were introduced into reaction tube 6 together with $H_2$ gas introduced from gas introducing inlet 4.

The partial pressures of the reaction gases in the reaction tube were as follows: $PTiCl_4 = 15.8$ torr, $PBBr_3 = 89.1$ torr, $PH_2 = 655$ torr. The total gas flow rate was maintained at 200 ml/min.

A graphite plate was used as substrate 8, and fine Pt particles having a particle diameter of 50 to 1000 Å were used as metal catalyst 7. An electrical resistance furnace was used as heating device 9. By this heating device, the substrate 8 was heated to 870° to 1100° C., and the chemical vapor-phase reaction was carried out for 90 minutes. Titanium boride fibers grew on the substrate 8. The resulting fibers had a diameter distributed within the range of about 100 to 4000 Å, and a length of several μm (maximum 20 μm, average 8 μm).

EXAMPLE 2

The same chemical vapor-phase reaction as in Example 1 was carried out except that a Pt thin film vacuum deposited on a graphite plate to a thickness of about several hundred Å was used as the metal catalyst, and the substrate was heated to 1110° to 1120° C. The resulting titanium boride fibers had a diameter distributed within the range of 10 Å to 200 Å and a length of several tens of μm (maximum 30 μm, average 20 μm).

EXAMPLES 3-5

The same chemical vapor-phase reaction as in Example 1 was carried out except that fine particles of Cu, Au or Pd having an average particle diameter of 500 Å supported on a graphite plate were used as the metal catalyst and the temperature for heating the substrate was changed to 900° to 950° C. The resulting titanium boride fibers and a diameter of about 2000 Å and a length of several μm.

The frequency of occurrence of fibers was less than in the case of using the Pt catalyst.

EXAMPLE 6

Powders of Ni, Ti and B were vacuum-sealed in a quartz tube, and heated at 1000° C. for 24 hours to prepare a 24.5 atomic % Ni-TiB$_2$ ternary alloy. The alloy was pulverized into fine particles having a particle diameter distributed within the range of 1000 Å to several μm. The fine particles as a catalyst were sprinkled on a graphite plate and the graphite plate was set up in a transparent quartz tubular reactor and heated to 1100° C. by a heating furnace. As materials for chemical vapor-phase, TiCl$_4$ and BBr$_3$ were used. They were placed into evaporators and maintained at 0° C. H$_2$ gas was passed through the evaporators at a rate of 60 cc/min. and 40 cc/min. respectively to form saturated gases. The saturated gases were diluted with H$_2$ gases at 100 cc/min. and introduced into the reaction tube. The reaction was carried out for 50 minutes under these conditions at atmospheric pressure. As a result, TiB$_2$ fibers having a diameter of several hundred Å to several microns and a length of 1 to 2 mm were obtained on the graphite plate. When about 1 mg of the catalyst was used, the total amount of the resulting fibers was about 300 mg.

EXAMPLE 7

By the same method as in Example 6, a fine particulate catalyst composed of 24.5 atomic % Ni-Ti alloy was prepared, and by using this catalyst, TiB2 fibers were produced by the same method as in Example 6.

EXAMPLE 8

TiB$_2$ fibers were produced by the same method as in Example 6 except that a fine particulate catalyst composed of 50 atomic % Ni-B alloy was used as the catalyst, and the temperature of synthesizing the fibers was changed to 800° C. The resulting fibers included B fibers having a rhombic structure.

EXAMPLE 9

TiB fibers were produced by the same method as in Example 6 using each of fine particulate catalysts of 33 atomic % Pd-TiB$_2$ alloy, 33 atomic % Pd-Ti alloy and 70 atomic % Pd-B alloy. The resulting fibers had a uniform diameter of as small as several hundred Å.

EXAMPLE 10

TiB$_2$ fibers were obtained by the same method as in Example 6 using each of fine particulate catalysts of 16 atomic % Pt-TiB$_2$ alloy, 16 atomic % Pt-Ti alloy and 70 atomic % Pt-B alloy.

EXAMPLE 11

The apparatus shown in FIGS. 3 and 4 was used. An infrared ray image furnace adapted for elliptical reflective tubular light-converging and having a heating length of 265 mm and a total length of 361 mm was used as heating device 19, and a transparent quartz tube having an inside diameter of 42 mm and a length of 1000 mm was used as reaction tube 16. A substrate 18 of graphite was supported on a transparent quartz supporting stand 21 and thermally insulated from reaction tube 16. A fine particulate Pt catalyst 17 was placed on the substrate 18. The measurement and control of the reaction temperature were effected by embedding a thermocouple 22 in a hole formed in the substrate 18. The outside of the reaction tube was cooled with a low temperature N$_2$ gas jet 23.

Using this apparatus, vapors of TiCl$_4$ and BBr$_3$ were reduced at 900° C. using H$_2$ gas as a carrier. The partial pressures of the starting materials were as follows: PBBr$_3$=89.1 torr, PTiCl$_3$=15.8 torr, and PH$_2$=655 torr. The total gas flow rate was maintained at 200 ml/min. At this time the stable current in the infrared image furnace was 19 A, and the power was 3.8 KW. The pressure at the inlet of the low temperature N$_2$ gas jet was adjusted to 4.0 kg/cm$^2$.

Under the above conditions, the chemical vaporphase reaction of the starting materials was carried out for 50 minutes to give TiB$_2$ fibers at a rate of about 0.2 g/cm$^2$-hour on the substrate. After the end of the reaction, no TiB$_2$ film or reaction product were seen to adhere to the inside wall of the reaction tube.

EXAMPLE 12

Example 11 was repeated except that 5 mole % of B$_2$H$_6$ diluted with H$_2$ gas was used as the boron compound, a 24.5 atomic % Ni-Ti alloy powder was used as the catalyst, and the reaction was carried out at 1100° C. TiB$_2$ fibers were obtained which had a length of several tens of microns at a maximum and a diameter of several hundred to several thousand Å.

EXAMPLE 13

By the same method as in Example 6, a fine particulate catalyst composed of 24.5 atomic % Ni-Zr alloy was prepared, and using this catalyst, ZrB$_2$ fibers were produced in the same apparatus as used in Example 11. ZrCl$_4$ was used as the evaporable Zr compound. About 5 g of ZrCl$_4$ was placed in the reaction tube about 20 cm away from the inlet of the image furnace, and a nichrome wire was wound up over a width of 5 cm on the outside wall of the reaction tube at a part corresponding to the part of ZrCl$_4$ to maintain the temperature of the outside wall of the reaction tube at about 120° C. BBr$_3$ as a material for B was put in an evaporator kept at 0° C., and H$_2$ gas was passed through the evaporator at 40 ml/min. to form a saturated gas. The saturated gas was diluted with 100 ml/min. of H$_2$ gas and introduced into the reaction tube.

Under these conditions, the reaction was carried out at a temperature of 1150° to 2000° C. for 120 minutes to give $ZrB_2$ fibers on the graphite plate.

EXAMPLE 14

Example 12 was repeated except that 5 mole % of $B(CH_3)_3$ diluted with $H_2$ gas was used as the boron compound, and a 24.5 atomic % Ni-Ti alloy powder was used as the catalyst. $TiB_2$ fibers the same as in Example 12 were obtained.

We claim:

1. A process for producing fibers of a transition metal boride, which comprises reacting a mixture of a vapor of an evaporable boron compound and a vapor of an evaporable transition metal compound in the presence of fine particles, having a diameter of 10 Å to 100 μm, of a metal member selected from the group consisting of Pt, Pd, Cu, Au and Ni or a binary or ternary metal alloy containing at least one metal member selected from the group consisting of Pt, Pd, Cu, Au and Ni, without applying any electric current, and wherein the transition metal boride fibers grow on the fine particles.

2. The process of claim 1 in which the evaporable boron compound is a boron halide, diborane, or a trialkylborane.

3. The process of claim 1 in which the evaporable transition metal compound is a halogen compound of a transition metal.

4. The process of claim 1 in which the transition metal is selected from the group consisting of Ti, Zr, Hf, V, Cr, Nb, Mo, W, Sc and Ta.

5. The process of claim 4 in which the transition metal is Ti, Zr or Hf.

6. The process of claim 1 in which the metal member is a binary or ternary alloy composed of one metal selected from Ni, Pd and Pt and the constituent elements of the metal boride.

7. A process for producing fibers of a transition metal boride, which comprises reacting a mixture of a vapor of an evaporable boron compound and a vapor of an evaporable transition metal compound in the presence of a metal selected from the group consisting of Pt, Pd, Cu and Au.

8. The process of claim 7 in which the metal is in the form of particles having a diameter of 10 Å to 100 μm.

* * * * *